Oct. 2, 1962  J. F. SPIEGEL  3,056,635
KINGSBURY TYPE LEVELING PLATE THRUST BEARING
Filed July 5, 1961
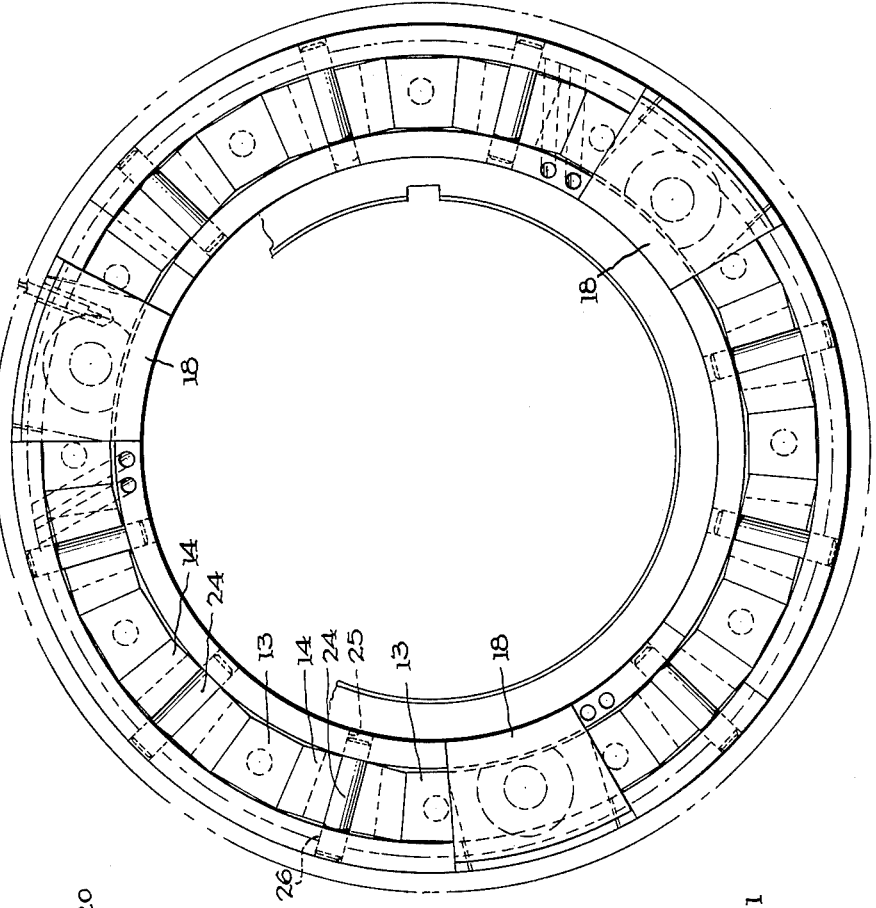
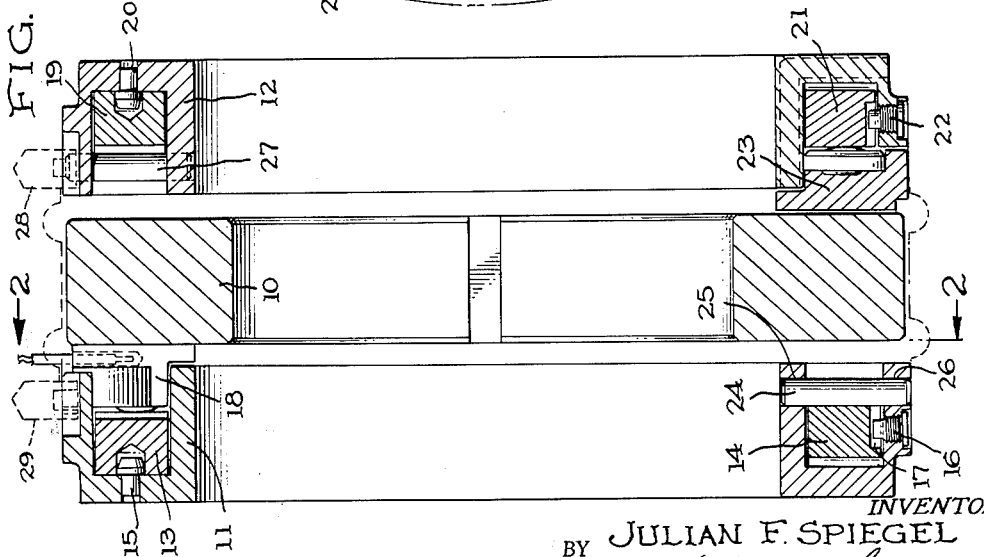
INVENTOR
BY JULIAN F. SPIEGEL
Cameron, Kerkam & Sutton
ATTORNEYS

//////

United States Patent Office 3,056,635
Patented Oct. 2, 1962

3,056,635
KINGSBURY TYPE LEVELING PLATE THRUST BEARING
Julian F. Spiegel, Philadelphia, Pa., assignor to Kingsbury Machine Works, Inc., Philadelphia, Pa., a corporation of Delaware
Filed July 5, 1961, Ser. No. 121,855
3 Claims. (Cl. 308—160)

This invention relates to Kingsbury type leveling plate thrust bearings and more particularly to such thrust bearings in which thrust bearing shoes can be omitted when the bearing is to receive a fractional load without interfering with the leveling plate action on the remaining bearing shoes.

The use of upper and lower leveling plates in Kingsbury type thrust bearings has been known since Kingsbury Patent No. 1,428,640 of September 12, 1922. Reference to FIG. 7 of this patent shows the now conventional cooperation between the upper and lower leveling plates with the upper leveling plates supporting the bearing shoes.

Omission of a bearing shoe in the structure of this patent would destroy the leveling plate action on the remainder of the bearing shoes. It has heretofore been considered necessary, therefore, to employ a full complement of bearing shoes for which the thrust bearing is designed when employing leveling plates of this type.

However, when fractional loads are to be exerted upon the bearing it is desirable to reduce the number of bearing shoes to reduce friction in the bearing and reduce power loss. It is also desirable to employ upper and lower leveling plates in such a thrust bearing having a reduced number of bearing shoes. The present invention, for the first time, provides a Kingsbury type leveling plate thrust bearing in which selected numbers of bearing shoes, less than the number for which the bearing is designed, may be used without destroying the action of the leveling plates. The action of the leveling plates is maintained in the present concept by providing in the base ring of the bearing at positions where the bearing shoes have been omitted removable stops against which the upper leveling plates for the omitted shoes can bear to function as if the shoes were present.

It is therefore the object of the present invention to provide a novel Kingsbury type leveling plate thrust bearing in which bearing shoes may be omitted for fractional loads without destroying the action of the leveling plates.

Another object of the present invention is to provide such a bearing in which the upper leveling plates at the positions of the omitted bearing shoes bear against stops carried by the base ring to maintain their relative positions with respect to the remainder of the leveling plates so that their function is not impaired by the absence of their respective bearing shoes.

Another object is to provide such a bearing in which a removable pin is mounted through the walls of the base ring at each position where a bearing shoe has been omitter for engagement by the respective upper leveling plate.

Another object of the present invention is to provide such a novel thrust bearing, normally provided with twelve bearing shoes, which can be utilized with symmetrically disposed bearing shoe arrangements utilizing 2, 3, 4, 6, 8, or 10 shoes when fractional loads are to be encountered without destroying the equalizing action of the leveling plate.

Other and further objects of the present invention will appear from the following description of an illustrative embodiment thereof. This illustrative embodiment should not be construed as defining or limiting the invention.

The present invention is capable of various mechanical embodiments one of which is shown in the accompanying drawing and is described hereinafter to illustrate the invention. In the accompanying drawing in which like reference characters indicate like parts, FIG. 1 is a sectional view of a typical Kingsbury type leveling plate thrust bearing to receive thrust in either direction from a thrust collar mounted in known manner upon a shaft, not shown; and FIG. 2 is a view on the line 2—2 of FIG. 1.

The illustrative embodiment of FIGS. 1 and 2 is designed to utilize a maximum of twelve bearing shoes when needed and three symmetrically disposed shoes are seen in FIG. 2 to illustrate a bearing having a reduced number of shoes. In the figures 10 is a conventional thrust collar mounted upon a shaft, not shown, and having on each side thereof base rings 11 and 12 for a conventional Kingsbury type leveling plate thrust bearing mounted in the bearing housing in known manner. Within base ring 12 are mounted a plurality of lower leveling plates 13 and upper leveling plates 14 cooperating therewith. Lower plates 13 are maintained in position by plugs 15 and upper plates 14 are prevented from rotation and held in position by set screws 16 engaging in slots 17. Conventional Kingsbury type bearing shoes 18 are mounted upon certain of the upper leveling plates and are maintained in position and are lubricated by well known and conventional constructions.

The same arrangement is provided for base ring 12 where the lower leveling plates are shown at 19 and are held in position by plugs 20 with the upper leveling plates shown at 21 and held in position by set screws 22 and supporting a selected number of bearing shoes 23.

In those positions in base ring 11 where bearing shoes have been omitted pins 24 are mounted in suitable radially disposed openings 25 and 26 in the upper edges of the base ring to be engaged by the adjacent upper leveling plate 14.

For base ring 12 where shoes 23 are omitted, pins 27 are provided passing radially through the upper walls of the base ring to be engaged by the adjacent upper leveling plate 21. Pins 24 and 27 can be secured in their respective base rings by suitable means, when required, and may be locked in position by dowel keys generally indicated at 28 and 29.

When the embodiment of the present invention described above is in use and pressure builds up upon one or more of the bearing shoes this pressure is exerted upon the adjacent leveling plate or leveling plates which acting through the chain of leveling plates lifts the other bearing shoes to take their proportionate share of the load it being noted that the upper leveling plates in those positions where bearing shoes have been omitted bear against their respective pins to transmit the leveling forces through the chain of leveling plates to the other bearing shoes.

It should now be apparent that the present invention in every way satisfies the objectives discussed above.

Changes in or modifications to the above described illustrative embodiment of this invention may now be suggested to those skilled in the art without departing from the present inventive concept. Reference should therefore be had to the appended claims to determine the scope of this invention.

What is claimed is:

1. In a Kingsbury type leveling plate thrust bearing having a thrust collar, a base plate, cooperating upper and lower leveling plates in said base plate and bearing shoes mounted on certain of the upper leveling plates and in thrust receiving engagement with the thrust collar, the improvement of means carried by said base ring for and engaged by and receiving thrust from each of the upper leveling plates having no bearing shoe associated therewith whereby the action of the leveling plates is transmitted to the bearing shoes through the leveling plates devoid of bearing shoes.

2. A bearing as described in claim 1, said means including a pin mounted in the base ring in a radius thereof.

3. A bearing as described in claim 1, said means comprising a removable stop mounted in the base ring between the adjacent upper leveling plate and the thrust collar.

References Cited in the file of this patent

FOREIGN PATENTS 708,426    Great Britain _____ May 5, 1954